US009511437B2

(12) United States Patent
Rakozy

(10) Patent No.: US 9,511,437 B2
(45) Date of Patent: Dec. 6, 2016

(54) CHAMBER-LESS THERMAL JOINING SYSTEM

(71) Applicant: General Electric Company, Schenectady, NY (US)

(72) Inventor: Kurt Allen Rakozy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 13/970,905

(22) Filed: Aug. 20, 2013

(65) Prior Publication Data

US 2015/0053669 A1 Feb. 26, 2015

(51) Int. Cl.
*B23K 1/00* (2006.01)
*B23K 13/01* (2006.01)
*B23K 31/02* (2006.01)
(Continued)

(52) U.S. Cl.
CPC ............... *B23K 1/002* (2013.01); *B23K 1/18* (2013.01); *B23K 13/01* (2013.01); *B23K 13/025* (2013.01); *B23K 13/06* (2013.01); *B23K 31/02* (2013.01); *B23K 2201/06* (2013.01); *B23K 2203/02* (2013.01); *B23K 2203/12* (2013.01); *C21D 9/50* (2013.01)

(58) Field of Classification Search
CPC ...... B23K 1/002; B23K 13/01; B23K 31/02; B23K 1/18; B23K 13/06; B23K 13/025; B23K 2201/06; B23K 2203/02; B23K 2203/12; C21D 9/50
USPC ........ 219/603, 607, 615–617, 629, 633–635, 219/643, 674; 228/112.1, 113, 114, 114.5, 228/181, 232.2
See application file for complete search history.

(56) References Cited

U.S. PATENT DOCUMENTS 2,843,727 A * 7/1958 Benz, Jr. ............... B23K 9/007
219/137.42
4,319,120 A * 3/1982 la Rocca ............... B23K 26/12
219/121.6
(Continued)

FOREIGN PATENT DOCUMENTS

JP 0523840 A 2/1993
JP 06098907 A * 4/1994
JP 06114545 A 4/1994

OTHER PUBLICATIONS

International Search Report and Written Opinion issued in connection with corresponding PCT Application No. PCT/US2014/051528 dated Dec. 22, 2014.

*Primary Examiner* — Quang Van
(74) *Attorney, Agent, or Firm* — Ernest G. Cusick; Hoffman Warnick LLC

(57) ABSTRACT

Various embodiments of the invention include solutions for chamber-less thermal joining. A first aspect includes a system for performing a thermal joining of a joint space defined by a metallic part without an environmental chamber thereabout. The system may include an induction coil for heating an area adjacent to the joint space defined by the metallic part for the thermal joining of the joint space. The system may also include a gas lens for directing a shielding gas towards the joint space, and a valve system for controlling a flow of the shielding gas from the gas lens. A vacuum system creates a negative pressure in the metallic part to urge the shielding gas through the joint space during the thermal joining, thus allowing thermal joining of the metallic part without an environmental chamber thereabout.

22 Claims, 3 Drawing Sheets

(51) Int. Cl.
*B23K 9/00* (2006.01)
*B23K 1/002* (2006.01)
*B23K 1/18* (2006.01)
*B23K 13/02* (2006.01)
*B23K 13/06* (2006.01)
*C21D 9/50* (2006.01)

(56) References Cited

U.S. PATENT DOCUMENTS

| | | |
|---|---|---|
| 4,533,806 A | 8/1985 | Kawasaki et al. |
| 5,418,811 A | 5/1995 | Ruffini et al. |
| 5,477,034 A | 12/1995 | Dennis |
| 5,588,019 A | 12/1996 | Ruffini et al. |
| 6,288,376 B1 | 9/2001 | Tsumura |
| 6,637,642 B1* | 10/2003 | Lingnau ............... B23K 13/00 219/601 |
| 6,852,952 B1* | 2/2005 | Kihara ................. B23K 9/167 219/383 |
| 8,448,839 B1 | 5/2013 | Rakozy et al. |
| 2003/0016724 A1* | 1/2003 | Fishman ................ H05B 6/04 373/146 |
| 2006/0169752 A1 | 8/2006 | Den Boer et al. |
| 2012/0115317 A1* | 5/2012 | Okumura .......... H01J 37/32412 438/513 |
| 2013/0119048 A1 | 5/2013 | Martin |
| 2013/0248585 A1 | 9/2013 | Rakozy et al. |

* cited by examiner

CHAMBER-LESS THERMAL JOINING SYSTEM

FIELD OF THE INVENTION

Aspects of the invention relate generally to thermally joining parts. More particularly, various aspects of the invention relate to thermal joining systems without an environmental chamber thereabout.

BACKGROUND OF THE INVENTION

In certain thermal joining processes, such as brazing or soldering, operation outside of inert environments requires a flux to prevent oxides from forming while the metal is heated, in addition to cleaning any contamination left on the joined surfaces. The flux may be applied using paste, liquid, powder, or joining material rods with a flux coating. During a thermal cycle, the flux melts first into the joint and is displaced by a filler material, e.g., braze alloy, and occupies the joint.

Fluxes can vary in performance, and are generally selected in view of the particular base metal(s) being joined. For example, phosphorus-containing brazing alloys can be self-fluxing when joining copper to copper, e.g., BCup-5, but braze alloys containing phosphorus produce brittle phosphides if used with iron or nickel base metals. However, in other situations a non-phosphorus alloy may be required where high corrosion life is a requirement. Typically, the flux should be chemically compatible with both the joining alloy and the base metal being used to prevent preferential corrosive attack.

Copper joints requiring non-phosphorus joining alloys contain silver, i.e., Ag, for corrosion resistance. Typically, non-phosphorus joining alloys require a controlled environment to prevent oxide contamination and joint porosity. For example, contemporary brazing systems utilize brazing chambers on the factory floor for part sub-assembly. Parts cannot be assembled at the point of use, e.g., in the field or during assembly line installation, or brazed in position due to the size and complexity inherent in chamber brazing restrictions. Consequently, these situations increase labor costs and decrease production throughput.

BRIEF DESCRIPTION OF THE INVENTION

A chamber-less thermal joining system is disclosed herein. A first aspect of the invention includes a system for performing a thermal joining of a joint space defined by a metallic part without an environmental chamber thereabout. The system includes an induction coil for heating an area adjacent to the joint space defined by the metallic part for the thermal joining of the joint space. The system also includes a gas lens for directing a shielding gas towards the joint space, and a valve system for controlling a flow of the shielding gas from the gas lens. A vacuum system creates a negative pressure in the metallic part to urge the shielding gas through the joint space during the thermal joining, allowing the thermal joining without an environmental chamber.

A second aspect of the invention includes a system for performing a thermal joining of a joint space defined by a metallic part using an induction heating system without an environmental chamber thereabout. The system comprising: a gas lens positioned with the induction heating system for directing a shielding gas towards the joint space during heating by the induction heating system; a valve system for controlling a flow of the shielding gas from the gas lens; and a vacuum system for creating a negative pressure in the metallic part to urge the shielding gas through the joint space during heating by the induction heating system, allowing the thermal joining without the environmental chamber.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
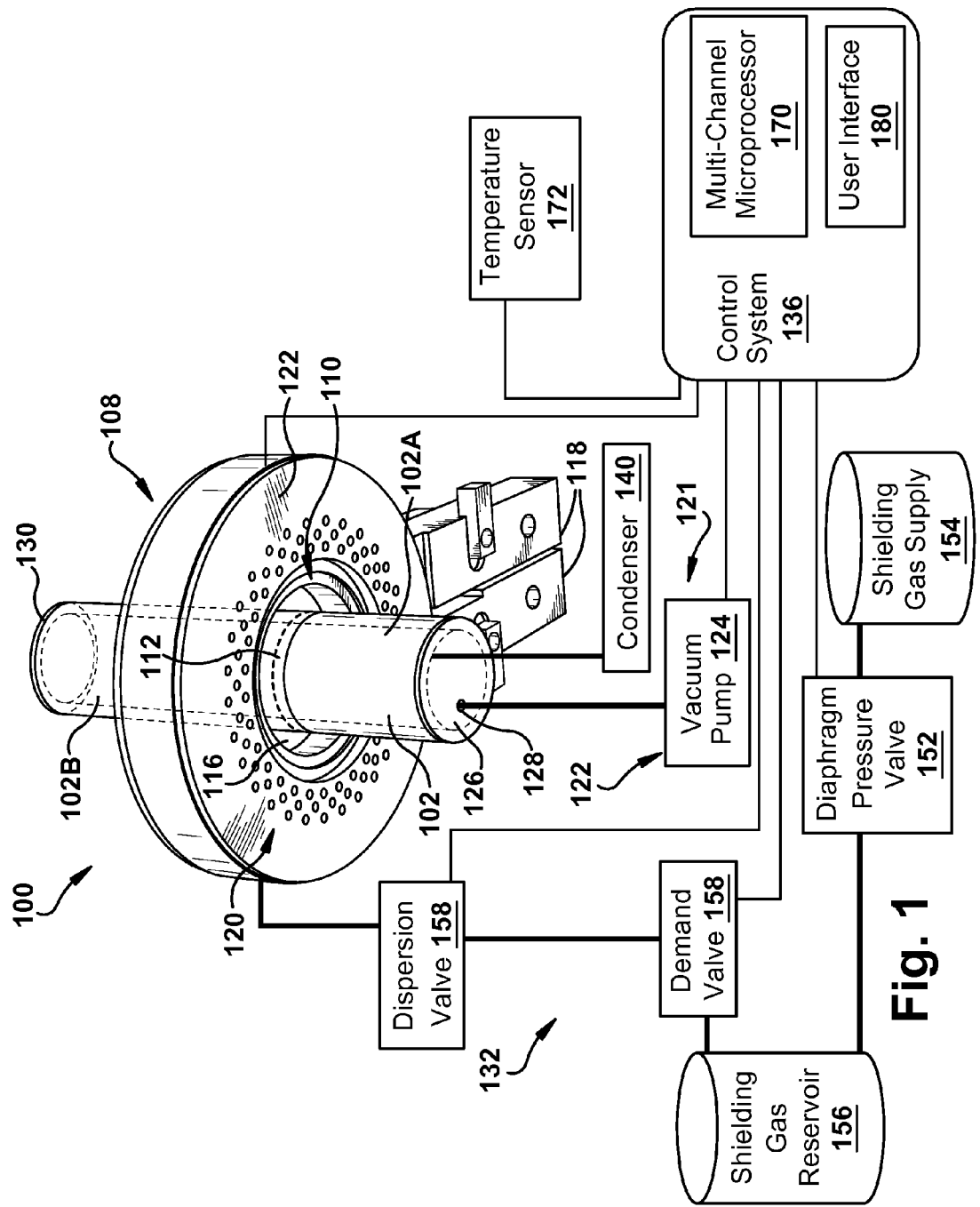
FIG. 1 shows a schematic diagram of a system according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated herein, embodiments of the invention relate generally to brazing. More particularly, various aspects of the invention relate to chamber-less non-phosphorus brazing system and related methods.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

As noted herein, copper joints requiring non-phosphorus brazing alloys containing silver for corrosion protection typically require a controlled brazing environment to prevent oxide contamination and joint porosity. Contemporary brazing systems utilize brazing chambers on the factory floor for part sub-assembly. Parts cannot be assembled at the point of use or brazed in position due to these restrictions. Consequently, this increases labor costs and decreases production output.

In contrast to conventional systems, various embodiments of the invention include a chamber-less thermal joining system that operates in a negative pressure closed loop manner. The closed loop negative pressure differential between an interior and exterior of a metallic part drafts a shielding gas (i.e., gas flux) through the part, and thus, deoxidizes the part. By creating a negative pressure in the part, it is possible to utilize a shielding gas to deoxidize metallic parts on a factory floor without an environmental chamber, decreasing expenses and labor costs.

Turning to FIG. 1, a chamber-less thermal joining system 100 is shown. For purposes of description, "thermal joining" will be described herein mainly as a brazing process. However, it is emphasized that "thermal joining" may include brazing, soldering, welding, and/or annealing to either join parts by filling a joint space there between or fill a joint space within one or more metallic parts. As is understood in the art, welding and brazing may be used to join metals together. As is further understood in the art, welding may be performed by melting and fusing metals together, usually by adding a filler material. Brazing, by contrast, usually does not involve melting the base metals being joined, and is usually performed at lower temperatures than welding. The teachings of the invention may also be applied to soldering and annealing of specific ferrous and non-ferrous materials. Also, the teachings may be applied to soldering, annealing and brazing materials with an alloy bearing phosphorus or zinc.

A metallic part 102 to be thermally joined, e.g., brazed, defines a joint space 112 where a joint will be formed by system 100. Joint space 112 may be a gap, a hole, or an open area in metallic part 102. Additionally, joint space 112 may be defined by a metallic part that includes two metallic parts. That is, metallic part includes a pair of (or more) metallic parts 102A, 102B and joint space 112 may be positioned between the pair of metallic parts. For example, joint space may be defined as a gap between an end of a first metallic part 102A and an end of a second metallic part 102B. Joint space 112 may be any size capable of being filled by the particular joining alloy being used. In practice, metallic part 102 can include, for example, a copper pipe, a pair of copper pipes, and/or comparable copper tubing. While a pipe or tubular metal part has been illustrated, it is understood that any shaped metallic part 102 (e.g., round, rectangular, square, etc.) capable of fitting within the confines of an induction heating system 108, described herein, may be thermally joined using system 100.

Induction heating system 108 heats an area adjacent to joint space 112 defined by metallic part 102. As illustrated and as discussed further herein, induction heating system 108 may include an induction coil 110. Other known forms of inducting heating systems 108 may also be employed. In the instant case, joint space 112 is aligned within induction coil 110, i.e., metallic part 102 has a clearance width relative to an opening 116 in induction coil 110 through which it is placed. In the case of a copper pipe, opening 116 in induction coil 110 is a corresponding tubular channel that surrounds metallic part 102. In various embodiments, metallic part 102 is fixed relative to induction coil 110, e.g., using any now known or later developed fixture (not shown). In an induction coil 110, high-frequency electricity wavelengths drive alternating current through the coil. In an embodiment, the power range approximately 10 kW to approximately 100 kW is used to drive AC current through the coil. The AC current varies a magnetic field in the area enclosed by the coil. This area is where joint space 112 is aligned within induction coil 110. The magnetic current flowing through metallic part 102 creates eddy currents, enabling thermal treatment (i.e., induction heating) of metallic part 102. Magnetic field distribution and heat patterns are controllable by a control system 136 to vary thermal treatment of metallic part 102. Induction coil 110 can be targeted to precise areas on metallic part 102. Only those areas of metallic part 102 within close proximity to the targeted area are thermally treated; the rest of metallic part 102 is not affected. In practice, a "FLUXTROL" brand induction coil, or any comparable induction coil known in the art, could be employed to supply the induction heating of the area on metallic part 102 adjacent joint space 112. In one embodiment, induction coil 110 is selectively separable into multiple parts, e.g., via separation members 118, such that is may be placed about a metallic part 102, e.g., in place in an industrial system.

With continuing reference to FIG. 1, chamber-less system 100 may include a gas lens 120. As will be described, gas lens 120 acts to direct a shielding gas towards joint space 112. In addition, gas lens 120 may act to evenly distribute the shielding gas around metallic part 102. Gas lens 120 may be provided as part of induction coil 110, or as a separate device. In any event, gas lens 120 includes a manifold 122 fluidly coupled to a valve system 132 (described elsewhere herein), and a plurality of nozzles 124 coupled to manifold 122 for directing the shielding gas towards the joint space 112. Nozzles 124, in contrast to conventional water-based systems, may be angled to direct the shielding gas radially inward towards joint space 112, e.g., at approximately 35-45°. In various embodiments where metallic part 102 is a pipe, the shielding gas provided by gas lens 120 shields metallic part from primary contaminant gases such as oxygen, carbon dioxide and/or carbon monoxide and nitrogen. Gas lens 120 provides shielding circumferentially around the circumferential outer surface of metallic part 102, partially enclosing metallic part 102 and joint space 112 and preventing the deleterious effects of oxide contamination.

System 100 can also include a valve system 132 for controlling a flow of the shielding gas from (to) gas lens 120. Valve system 132 includes a first, dispersion valve 150 operatively coupled to gas lens 120, i.e., manifold, for controlling a flow of the shielding gas to the gas lens. Valve system 132 also includes a second, diaphragm valve 152 operatively coupled between a shielding gas supply 154 and a shielding gas reservoir 156, and a third, demand valve 158 operatively coupled between shielding gas reservoir 156 and first, dispersion valve 150. As illustrated, each valve may be controlled by a control system 136, described herein.

In operation, diaphragm valve 152 may take the form of any now known or later developed diaphragm-type valve, e.g., include a rubber valve that is spring loaded, that allows a particular pressure of shielding gas to be delivered from shielding gas supply 150 to shielding gas reservoir 156, thus modulating the volume of shielding gas delivered to gas reservoir 156 and the maximum pressure of shielding gas delivered to gas lens 120. Diaphragm valve 152 may be set by control system 136. Gas reservoir 156 builds up a collection of shielding gas with gas fed from shielding gas supply 154. In an embodiment, gas reservoir 156 may includes a relief valve (not shown) for releasing excessive pressure in forming gas reservoir 156. Demand valve 158 supplies shielding gas from gas reservoir 156 at a value within a set pressure range as instructed by control system 136, i.e., at a value capped at a maximum (at pressure set by diaphragm valve 152) and a minimum pressure. Demand valve 158 may be set by control system depending on a number of factors, such as metallic part or joint space size, induction heating system size, gas lens size, nozzle size, etc., to provide the shielding gas at the correct pressure to flux joint space 112 during operation. Demand valve 158 may, for example, be a gate valve, a butterfly valve, a globe valve, etc.

Dispersion valve 150 may have an open position and a closed position, where the closed position prevents flow of the shielding gas into gas lens 120. Dispersion valve 150 may be, for example, a two-way, servo valve controlled by control system 136. As is known in the art, a two-way valve either prevents a portion of the flow of a working fluid through a pathway, or allows the flow to pass. Dispersion valve 150 may primarily function in an open position (no obstruction), and can be actuated to function in a closed position (obstruction). However, dispersion valve 150 may also function in a partially open position (partial obstruction). Valve 150 may, for example, be a gate valve, a butterfly valve, a globe valve, a micro solenoid valve, etc. Dispersion valve 150 controls whether shielding gas is delivered to joint space or not. Dispersion valve 150 can thus control release of shielding gas prior to, during, and/or after formation of the joint in joint space 112.

System 100 may also include a vacuum system 122 for creating a negative pressure in metallic part 102 to urge the shielding gas through joint space 112. In various embodiments, vacuum system 122 may include a vacuum pump 124 operatively (in a sealed manner) disposed at a first end of metallic part 102. Vacuum pump 124 may be sealed to first end of metallic part 102 using any now known or later developed system such as a dam cover 126 having an opening 128 for (sealed) coupling with pump 124. Although illustrated at the end of metallic part 102, dam cove 126 may be positioned within and distal to the end of metallic part 102. In instances where the second end of metallic part 102 is unable to be otherwise sealed (e.g., physically structured to be closed, closed via a valve, etc.) to create adequate negative pressure, a dam cover 130 may be operatively (in a sealing manner) disposed at a second end of metallic part 102 to allow for creation of adequate negative pressure. Dam cover 130 may be any now known or later developed mechanism for sealing the second end of sealing metallic part 102, e.g., an inflatable device (like latex), a degradable device (paper or other dissolvable material), etc. Although illustrated at the end of metallic part 102, dam cove 130 may be positioned within and distal to the end of metallic part 102. During operation, vacuum pump 124 creates a negative pressure differential between an interior of metallic part 102 and joint space 112 and/or induction coil 110. The negative pressure differential drafts the shielding gas through metallic part 102. With continuing reference to FIG. 1, a condenser 140 for condensing water vapor from metallic part 102. Condenser 140 can be interposed between vacuum pump 124 and metallic part 102, or otherwise positioned. Condenser 140 acts to condense water vapor from metallic part 102 and/or the joint and direct the water to a drain (not shown).

Referring again to FIG. 1, in various embodiments, system 100 also includes a control system 136 for controlling operation of induction coil 110, valve system 132 and vacuum system 122. In particular, control system 136 controls operation of valve system 132 to control the flow of the shielding gas from (to) gas lens 120. Control system 136 can be configured to initiate distribution of the shielding gas from shielding gas dispersion valve 150, and introduce that shielding gas directly to joint space 112, metallic part 102, and/or the joint via gas lens 120. Control system 136 can provide instruction to induction coil 110 to initiate heating of metallic part 102. Additionally, control system 136 can provide instructions to induction coil 110 to perform increased or decreased heating in response to temperature measurement information.

Referring again to FIG. 1, control system 136 can include a multi-channel micro processor 170 having a user interface 180. User interface 180 may include a display for displaying at least a first category of information, such as operation options (e.g., initiate vacuum pump, initiate induction heating, vary induction heating, etc.). Operation of user interface 180 enables management of control system 136. Control system 136 can be further configured to perform processes such as: 1) initiate distribution of shielding gas from shielding gas dispersion valve 150 and introduce that shielding gas directly to joint space 112, metallic part 102, and/or the joint; 2) provide instructions to modify a flow rate of the shielding gas dispersion; 3) initiate and discontinue the closed loop negative pressure through vacuum system 122; 4) provide instruction to induction coil 110 to perform heating of metallic part 102; and 5) provide instructions to induction coil 110 to increase or decrease heating in response to temperature measurement information from a temperature sensor. Control system 136 may also track a braze heat cycle, gas flow, temperatures, etc., using any now known or later developed sensors and/or calculators.

Control system 136 may also function to control or receive data from any other now known or later developed equipment, sensors, etc., within system 100. For example, in various embodiments, system 100 also includes at least one temperature sensor 172 (e.g., optical pyrometer, IR sensor, etc.). Temperature sensor 170 can detect a temperature of joint space 112, induction coil 110 and/or metallic part 102. In various embodiments, temperature sensor 170 is coupled with control system 136, and can provide temperature data about the temperature of induction coil 110 and/or metallic part 102 to control system 136 on a rolling basis, on demand, or in any other manner. Temperature sensor 170 can further provide temperature data to an intermediary, e.g., a data store, which control system 136 can access to determine a temperature of induction coil 110 and/or metallic part 102.

Figure 2:
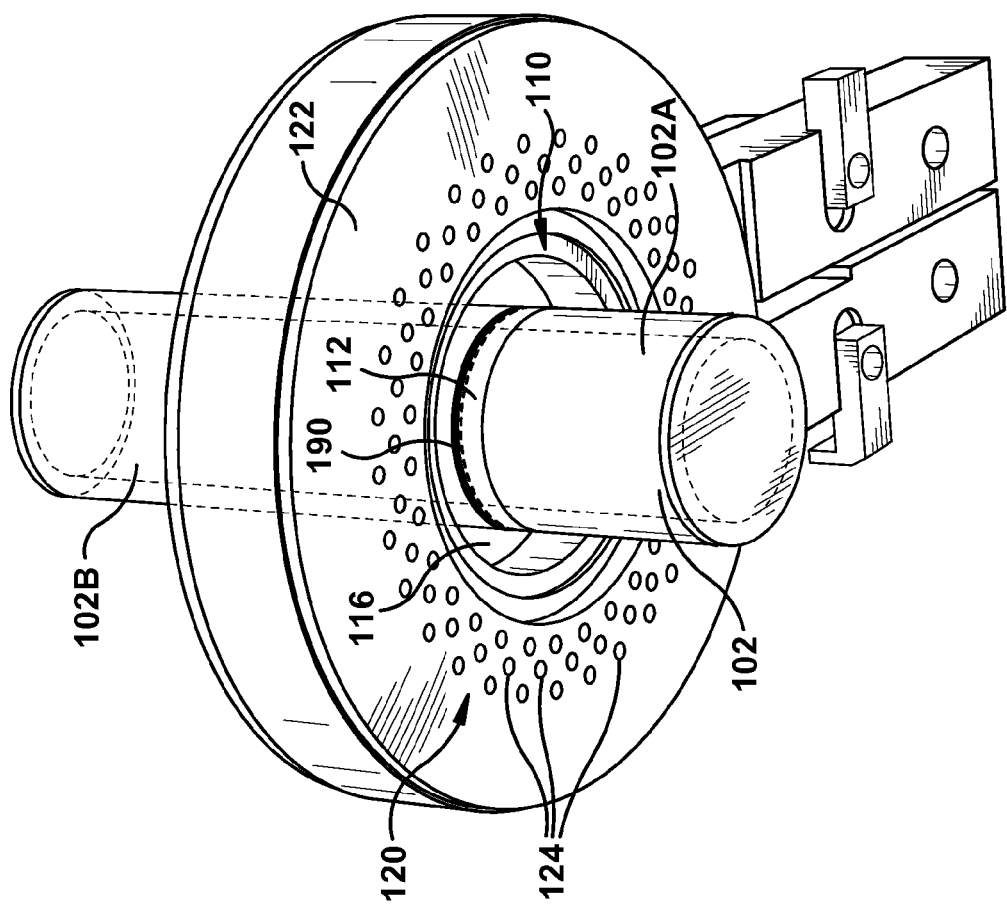
FIG. 2 shows a schematic diagram of a system according to various embodiments of the invention.

Referring to FIG. 2, in various embodiments, a non-phosphorus thermally responsive (brazing filler) material 190 may be disposed in joint space 112 defined by metallic part 102 where the joint will be formed. For example, material 190 may be provided in the instance where metallic part 102 is fixed to provide a gap circumferentially between metallic part 102 and induction coil 110. Brazing filler material 190 acts as a filler material and closes joint space 112, assisting in forming the joint. Thermally responsive material 190 may include any non-phosphorus alloy known in the art, for example, a silver alloy that is non-self-fluxing such as a member of the American Welding Society (AWS) brazing-silver family of brazing alloys with temperature ranges of, for example, approximately 618° C. (1150° F.) to approximately 1037° C. (1900° F.). For example, alloys referred to as AWS brazing-silver bearing alloy type 18 (AWS BAg-18) or 24 (AWS BAg-24), etc., may be employed.

Shielding gas, as used in various embodiments of system 100, may take a variety of forms that include nitrogen ($N_2$) and hydrogen ($H_2$). In addition, shielding gas may be non-phosphorus. In one embodiment, the shielding gas may be composed of: ammonia (AWS type 5, also called "forming gas") including, for example, 80-90% nitrogen ($N_2$) and 10-20% hydrogen ($H_2$) for non-phosphorus bearing alloys, or dissociated ammonia including, for example, 75% hydrogen and 25% nitrogen, for brazing copper, silver, nickel, copper-phosphorus and copper-zinc bearing filler metals. In another embodiment, shielding gas may include nitrogen and hydrogen, cryogenic or purified (AWS type 6A), including, for example: 70-99% $N_2$, 1-30% $H_2$, for brazing copper, brass, nickel alloys, Monel, medium and high carbon steels and chromium alloys. In another embodiment, the shielding gas may include nitrogen, hydrogen and carbon monoxide (CO), cryogenic or purified (AWS type 6B), including, for example: 70-99% $N_2$, 2-20% $H_2$, 1-10% CO for brazing copper, silver, low-nickel alloys, nickel, copper-phosphorus and copper-zinc bearing filler metals, medium and high carbon steel. Shielding gas may also include any other gas flux no known or later developed.

Figure 3:
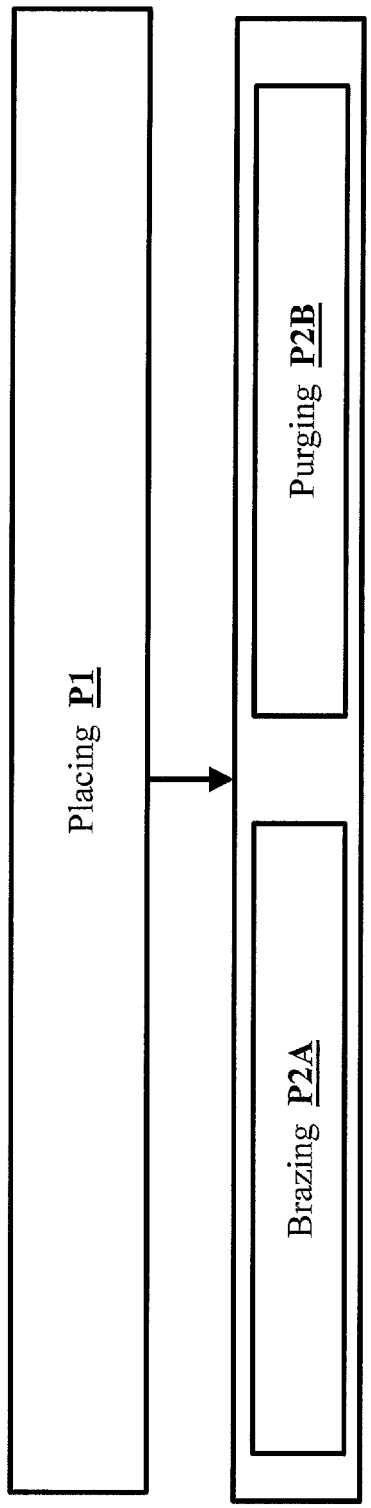
FIG. 3 shows a flow diagram illustrating a process of operation according to various embodiments of the invention.

Referring to FIG. 3, with continuing reference to FIG. 1 and FIG. 2, a flow diagram is shown illustrating a method according to various embodiments. As shown, the method can include the following processes:

Process P1 may include placing a non-phosphorus thermally responsive brazing filler material 190 on a portion of metallic part 102. The placement of thermally responsive brazing filler material 190 can be proximate joint space 112 defined by metallic part 102 such that thermal treatment of the metallic part 102 or material 190 will fill joint space 112 with the thermally responsive brazing filler material 190. In a separate embodiment, joint space 112 may be defined by two metallic parts. For example, the gap between a first end of a first metallic part 102A and a first end of a second metallic part 102B. As described herein, non-phosphorus thermally responsive brazing filler material 190 may include, e.g., BAg-18 or BAg-24, or any other non-phosphorus brazing filler material as is known in the art.

Process P2A includes thermally joining, e.g., brazing, metallic part 102 with non-phosphorus thermally responsive brazing filler material 190 to form a joint, i.e., using capillary action. Non-phosphorus thermally responsive brazing filler material 190 is heated by induction coil 110 at its melting point and distributed, by capillary action, in joint space 112 defined by metallic part 102. Brazing filler material 190 then flows over metallic part 102 (known as wetting) and within joint space 112. In an embodiment, the brazing process (P2A) is performed within the temperature range from approximately 676° C. (1240° F.) to approximately 843° C. (1550° F.). Control system 136 coupled with induction coil 110 can initiate and control the brazing process through the induction coil 110.

Process P2B includes urging a shielding gas through joint space 112 to deoxidize the joint formed therein. The shielding gas can be applied through dispersion valve 150 substantially across joint space 112 defined by metallic part 102. A pressure of shielding gas can be controlled by demand valve 158. Control system 136 can actively control demand valve 158 or dispersion valve 150 according to a desired flow rate or a user input. As described herein, a non-phosphorus shielding gas may include nitrogen and hydrogen. Vacuum system 122 including vacuum pump 124 disposed at a first end of metallic part 102 (and perhaps dam bore cover 130 disposed at a second end of metallic part 102) creates a seal and a closed loop in metallic part 102. The vacuum system induces a negative closed loop pressure in metallic part 102 and joint space 112. The negative closed loop pressure urges the shielding gas through joint space 112. The shielding gas interacts with and microscopically deoxidizes metallic part 102 and/or the joint, thus 'shielding' it/them from oxidation. This shielding gas chemical reduction can reduce copper-oxide formations into inert compounds that can be removed with a hot water rinse. Process P2B may be performed while, or substantially simultaneously with process P2A, as indicated in FIG. 3.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for performing a thermal joining of a joint space defined by a metallic part without an environmental chamber thereabout, the system comprising:
an induction coil for heating an area adjacent to the joint space defined by the metallic part for the thermal joining of the joint space;
a gas lens for directing a shielding gas towards the joint space;
a valve system for controlling a flow of the shielding gas from the gas lens;
a vacuum system for creating a negative pressure in the metallic part to urge the shielding gas through the joint space during the thermal joining,
wherein the vacuum system is operatively coupled to a first end of the metallic part to create the negative pressure; and
a removable dam operatively disposed at a second end of the metallic part to seal the second end of the metallic part.

2. The system of claim 1, further comprising a control system for controlling operation of the induction coil, the valve system and the vacuum system.

3. The system of claim 2, wherein the control system controls operation of the valve system to control the flow of the shielding gas from the gas lens.

4. The system of claim 3, wherein the valve system includes:
a first valve operatively coupled to the gas lens for controlling a flow of the shielding gas to the gas lens;
a second valve operatively coupled between a shielding gas supply and a shielding gas reservoir; and
a third valve operatively coupled between the shielding gas reservoir and the first valve,
wherein operation of each valve is controlled by the control system.

5. The system of claim 1, wherein the gas lens includes:
a manifold fluidly coupled to the valve system; and
a plurality of nozzles coupled to the manifold for directing the shielding gas towards the joint space.

6. The system of claim 5, wherein the manifold substantially surrounds the induction coil.

7. The system of claim 1, wherein the valve system includes:
a first valve operatively coupled to the gas lens for controlling a flow of the shielding gas to the gas lens;
a second valve operatively coupled between a shielding gas supply and a shielding gas reservoir; and
a third valve operatively coupled between the shielding gas reservoir and the first valve,
wherein each valve is controlled by a control system operative to control the gas flow to the gas lens.

8. The system of claim 1, wherein the metallic part includes a pair of metallic parts and the joint space is positioned between the pair of metallic parts.

9. The system of claim 1, further comprising a non-phosphorus thermally responsive material disposed within the joint space.

10. The system of claim 1, wherein the shielding gas includes nitrogen ($N_2$) and hydrogen ($H_2$).

11. The system of claim 1, a temperature sensor coupled with the control system for measuring a temperature of the joint space.

12. The system of claim 1, further comprising a condenser for condensing water vapor from the metallic part.

13. The system of claim 1, wherein the induction coil is selectively separable into multiple parts.

14. The system of claim 1, wherein the removable dam includes at least one of an inflatable device or a degradable device.

15. A system for performing a thermal joining of a joint space defined by a metallic part using an induction heating system without an environmental chamber thereabout, the system comprising:
a gas lens positioned with the induction heating system for directing a shielding gas towards the joint space during heating by the induction heating system;
a valve system for controlling a flow of the shielding gas from the gas lens,
wherein the gas lens includes:
a manifold fluidly coupled to the valve system; and
a plurality of nozzles coupled to the manifold for directing the shielding gas towards the joint space;
a vacuum system for creating a negative pressure in the metallic part to urge the shielding gas through the joint space during heating by the induction heating system, allowing the thermal joining without the environmental chamber;
wherein the vacuum system is operatively coupled to a first end of the metallic part to create the negative pressure; and
a removable dam operatively disposed at a second end of the metallic part to seal the second end of the metallic part.

16. The system of claim 15, further comprising a control system for controlling operation of the induction heating system, the valve system and the vacuum system.

17. The system of claim 16, wherein the control system controls operation of the valve system to control the flow of the shielding gas from the gas lens.

18. The system of claim 17, wherein the valve system includes:
a first valve operatively coupled to the gas lens for controlling a flow of the shielding gas to the gas lens;
a second valve operatively coupled between a shielding gas supply and a shielding gas reservoir; and
a third valve operatively coupled between the shielding gas reservoir and the first valve,
wherein operation of each valve is controlled by the control system.

19. The system of claim 15, wherein the metallic part includes a pair of metallic parts and the joint space is positioned between the pair of metallic parts.

20. The system of claim 15, wherein the shielding gas includes nitrogen ($N_2$) and hydrogen ($H_2$).

21. A system for performing a thermal joining of a joint space defined by a metallic part without an environmental chamber thereabout, the system comprising:
an induction coil for heating an area adjacent to the joint space defined by the metallic part for the thermal joining of the joint space;
a gas lens for directing a shielding gas towards the joint space;
a valve system for controlling a flow of the shielding gas from the gas lens;
a vacuum system for creating a negative pressure in the metallic part to urge the shielding gas through the joint space during the thermal joining,
wherein the vacuum system is operatively coupled to a first end of the metallic part to create the negative pressure;
a removable dam operatively disposed at a second end of the metallic part to seal the second end of the metallic part; and a condenser for condensing water vapor from the metallic part.

22. The system of claim 21, wherein the gas lens includes:
a manifold fluidly coupled to the valve system; and
a plurality of nozzles coupled to the manifold for directing the shielding gas towards the joint space,
wherein the manifold substantially surrounds the induction coil.

\* \* \* \* \*